(12) United States Patent
Bareket et al.

(10) Patent No.: US 10,440,762 B2
(45) Date of Patent: Oct. 8, 2019

(54) AUTOMATIC ESTABLISHMENT OF A VPN CONNECTION OVER UNSECURE WIRELESS CONNECTION

(71) Applicant: Safer Social Ltd., Tel-Aviv (IL)

(72) Inventors: Amit Bareket, Tel-Aviv (IL); Sagi Gidali, Rishon-LeZion (IL)

(73) Assignee: Safer Social Ltd., Tel-Aviv (IL)

( * ) Notice: Subject to any disclaimer, the term of this patent is extended or adjusted under 35 U.S.C. 154(b) by 148 days.

(21) Appl. No.: 15/415,991

(22) Filed: Jan. 26, 2017

(65) Prior Publication Data

US 2018/0213574 A1    Jul. 26, 2018

(51) Int. Cl.
| | |
|---|---|
| *H04W 76/12* | (2018.01) |
| *H04L 29/08* | (2006.01) |
| *H04L 29/06* | (2006.01) |
| *H04W 76/30* | (2018.01) |
| *H04L 12/26* | (2006.01) |
| *H04L 12/46* | (2006.01) |
| *H04W 12/10* | (2009.01) |
| *H04W 12/00* | (2009.01) |
| *H04W 40/24* | (2009.01) |

(52) U.S. Cl.
CPC ......... *H04W 76/12* (2018.02); *H04L 12/4633* (2013.01); *H04L 43/0811* (2013.01); *H04L 63/0272* (2013.01); *H04L 67/1097* (2013.01); *H04L 67/141* (2013.01); *H04L 67/143* (2013.01); *H04L 67/42* (2013.01); *H04W 12/001* (2019.01); *H04W 12/10* (2013.01); *H04W 40/246* (2013.01); *H04W 76/30* (2018.02)

(58) Field of Classification Search
None
See application file for complete search history.

(56) References Cited

U.S. PATENT DOCUMENTS

| | | | |
|---|---|---|---|
| 9,225,685 B2 | 12/2015 | Sharkey | |
| 9,438,564 B1* | 9/2016 | Weng | H04L 63/0281 |
| 2004/0199763 A1* | 10/2004 | Freund | G06F 21/53 |
| | | | 713/154 |

(Continued)

OTHER PUBLICATIONS

Cloak "OverCloak™: OverCloak Keeps You Safe by Blocking Insecure Communications Before Cloak's VPN Has A Chance to Activate", Cloak, 1 P., 2017.

(Continued)

*Primary Examiner* — Joshua Joo

(57) ABSTRACT

System and method for automatically establishing a Virtual Private Network (VPN) link between a mobile device and a VPN server over an unsecure wireless network, comprising, at the mobile device, detecting an attempt to establish a wireless connection to the internet via an unsecure wireless network, probing the unsecure wireless network to determine accessibility over the unsecure wireless network to a VPN server, automatically initializing, based on the determination, a VPN client, the VPN client executed to establishes a VPN link between the mobile device and the VPN server over the unsecure wireless network, directing network traffic of the mobile device through the VPN link and automatically terminating the VPN client when the mobile device disconnects from the unsecure wireless network.

11 Claims, 2 Drawing Sheets

(56) References Cited

U.S. PATENT DOCUMENTS

Figure 1:
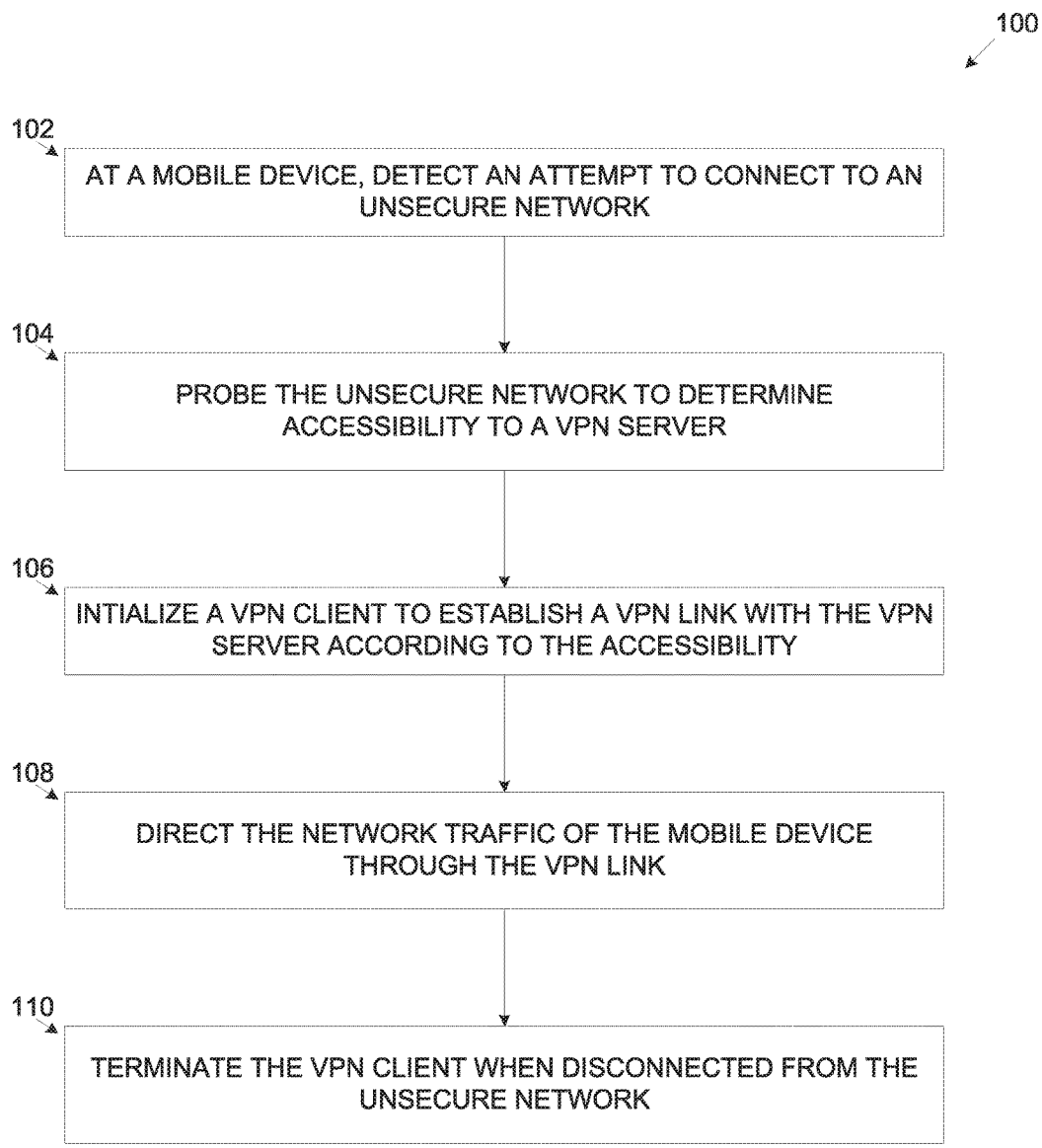

| | | | | |
|---|---|---|---|---|
| 2010/0329149 | A1* | 12/2010 | Singh | H04L 12/28 |
| | | | | 370/254 |
| 2012/0014327 | A1* | 1/2012 | Montemurro | G06F 9/5011 |
| | | | | 370/328 |
| 2012/0254608 | A1* | 10/2012 | Ho | H04L 45/38 |
| | | | | 713/153 |
| 2012/0287904 | A1* | 11/2012 | Taniuchi | H04W 8/02 |
| | | | | 370/331 |
| 2014/0137184 | A1* | 5/2014 | Russello | G06F 21/60 |
| | | | | 726/1 |
| 2014/0207943 | A1* | 7/2014 | Tse | H04L 12/4633 |
| | | | | 709/224 |
| 2014/0207946 | A1* | 7/2014 | Bakthavathsalu | H04L 63/0272 |
| | | | | 709/224 |
| 2015/0082419 | A1* | 3/2015 | Sharkey | H04L 63/0272 |
| | | | | 726/15 |
| 2015/0188889 | A1* | 7/2015 | Lawson | H04L 63/0272 |
| | | | | 726/15 |
| 2017/0078336 | A1* | 3/2017 | Aluvala | H04L 65/1069 |
| 2017/0111792 | A1* | 4/2017 | Correia Fernandes | |
| | | | | H04W 4/24 |
| 2017/0366646 | A1* | 12/2017 | Bradley | H04L 67/34 |

OTHER PUBLICATIONS

Nexus "Connect Automatically to Open Wi-Fi Networks", Nexus Help, 3 P., 2017.

* cited by examiner

AUTOMATIC ESTABLISHMENT OF A VPN CONNECTION OVER UNSECURE WIRELESS CONNECTION

FIELD AND BACKGROUND OF THE INVENTION

The present invention, in some embodiments thereof, relates to establishing a Virtual Private Network (VPN) over an unsecure wireless network and, more particularly, but not exclusively, to establishing automatically a VPN over an unsecure wireless network.

Availability of wireless networks in particular public wireless networks is rapidly increasing to allow users using mobile devices to connect to the internet. While providing convenient access to the internet, the public wireless networks may often be unsecure networks in which the transmitted information may be intercepted, snooped and possibly subject to malicious attacks.

As online activity, for example, commerce, banking, gaming and/or the like rapidly increases private, sensitive and/or personal information of the users involved in the online activity may be transferred between their mobile devices and the remote servers providing the online services. Moreover, frequently the users may be unaware of at least some information transfers which may be initiated automatically in the background.

As result engaging in the online activity over the potentially unsecure wireless networks may present a major risk to privacy, security and/or integrity of the users' information.

SUMMARY OF THE INVENTION

According to a first aspect of the present invention there is provided a method of automatically establishing a Virtual Private Network (VPN) over an unsecure wireless network, comprising using one or more processors of a mobile device for:
  Detecting an attempt to establish a wireless connection to the internet via an unsecure wireless network.
  Probing the unsecure wireless network to determine accessibility of the unsecure wireless network to a VPN server.
  Initializing automatically a VPN client based on the determination, the VPN client executed by the one or more processors establishes a VPN link to the VPN server over the unsecure wireless network.
  Directing network traffic of the mobile device through the VPN link.
  Terminating automatically the VPN client when the mobile device disconnects from the unsecure wireless network.

Automatically initializing and terminating the VPN client only when needed may significantly reduce the power consumption of the mobile device since the VPN client executes only when needed while terminated when the VPN link is not needed and/or cannot be established. Reducing the power consumption of the mobile device may in turn increase the battery life. Moreover, the user may be relieved of manually initiating and/or terminating the VPN client.

According to a second aspect of the present invention there is provided a mobile device for automatically establishing a Virtual Private Network (VPN) over an unsecure wireless network, comprising one or more processors of a mobile device adapted to execute code, the code comprising:

Code instructions to detect an attempt to establish a wireless connection to the internet via an unsecure wireless network.
  Code instructions to probe the unsecure wireless network to determine accessibility of the unsecure wireless network to a VPN server.
  Code instructions to initialize automatically a VPN client based on the determination, the VPN client executed by the one or more processors establishes a VPN link to the VPN server over the unsecure wireless network.
  Code instructions to direct network traffic of the mobile device through the VPN link.
  Code instructions to terminate automatically the VPN client when the mobile device disconnects from the unsecure wireless network.

With reference to the first and/or the second aspects of the invention, according to a first implementation, the detecting is made by monitoring a network detection event reported by one or more network control modules. The monitoring comprises attaching to one or more services initiated by the one or more network control modules. The one or more services are members of a group consisting of: an interrupt event, a notification message, a system call and a function call. The flexibility provided in monitoring the activity in order to detect the attempt may allow implementation, integration and support for a plurality of mobile devices hosting a plurality of network control software modules and/or Operating Systems (OS).

With reference to first and/or the second aspects of the invention and the first implementation, according to a second implementation, the accessibility comprises at least an internet access, a free network port and an active account on the VPN server. This may allow detecting the minimal operational requirements for establishing the VPN link and avoiding the attempt to initiate the VPN client when such requirements are not fulfilled thus avoiding consuming resources of the mobile device, for example, computation resource, storage resources, battery power and/or the like.

With reference to first and/or the second aspects of the invention and/or any of the previous implementations, according to a third implementation, the probing comprises periodically probing the unsecure wireless network to determine the accessibility. This may allow detection of changes in the availability of the minimal operational requirements for establishing the VPN link that may take place over time. Moreover, this may allow a user of the mobile device to establish an internet link first in case user intervention is required and only then the process for automatically establishing the VPN link may commence.

With reference to first and/or the second aspects of the invention and/or any of the previous implementations, according to a fourth implementation, one or more routing entries are adjusted in a routing record of a network interface of the mobile device to support resolution of an address of the VPN server. Manipulating the routing record (e.g. routing table) may be necessary for the VPN client to connect to the VPN server.

Optionally, with reference to first and/or the second aspects of the invention and/or any of the previous implementations, according to a fifth implementation, one or more entries in the routing record of the network interface of the mobile device are adjusted to prevent the network traffic from going through the unsecure wireless network without going through the VPN link. This may ensure that all data transfer to/from the mobile device is made through the VPN link and preventing any data transfer through the unsecure network.

Optionally, with reference to first and/or the second aspects of the invention and/or any of the previous implementations, according to a sixth implementation, the network traffic is prevented from going through the unsecure wireless network while the VPN link is not operational due to one or more operational conditions of the VPN link. The one or more operational conditions are members of a group consisting of: initializing, connecting, disconnecting, reconnecting and failed. This may further ensure that no data transfer is made through the unsecure network even when the VPN link is not operational.

Optionally, with reference to first and/or the second aspects of the invention and/or any of the previous implementations, according to a seventh implementation, one or more original entries in a routing record of a network interface of the mobile device are restored after disconnecting from the unsecure wireless network. The one or more original entries are adjusted to support the VPN link over the unsecure wireless network. Restoring the routing record to its original state (as it was prior to establishing the VPN link) reinstates the network routing policy usually, typically and/or normally employed by the network control modules controlling the network interface of the mobile device.

Optionally, with reference to first and/or the second aspects of the invention and/or any of the previous implementations, according to an eighth implementation, a user of the mobile device is indicated of a status of the VPN link. This may allow the user to be aware of the VPN link status. The user may take measures according to the indication.

Optionally, with reference to first and/or the second aspects of the invention and/or any of the previous implementations, according to a ninth implementation, an event entry is logged for the attempt in a log record. The event entry comprises one or more network connection parameters of a link established by the attempt. This may allow tracking network activity in general and VPN link activity in particular. The activity may be analyzed to identify, for example, connection patterns, failure modes and/or the like.

Optionally, with reference to first and/or the second aspects of the invention and/or any of the previous implementations, according to a tenth implementation, at least some network traffic data that is blocked while the VPN link is not operational is stored. The VPN link is not operational due to one or more operational conditions of the VPN link which are members of a group consisting of: initializing, connecting, disconnecting, reconnecting and failed. This may allow re-sending data that was blocked while the VPN link was not operational over the unsecure wireless network. The blocked data may be sent, for example, when the mobile device connects again to a network, either a secure network or through a VPN link over an unsecure network.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
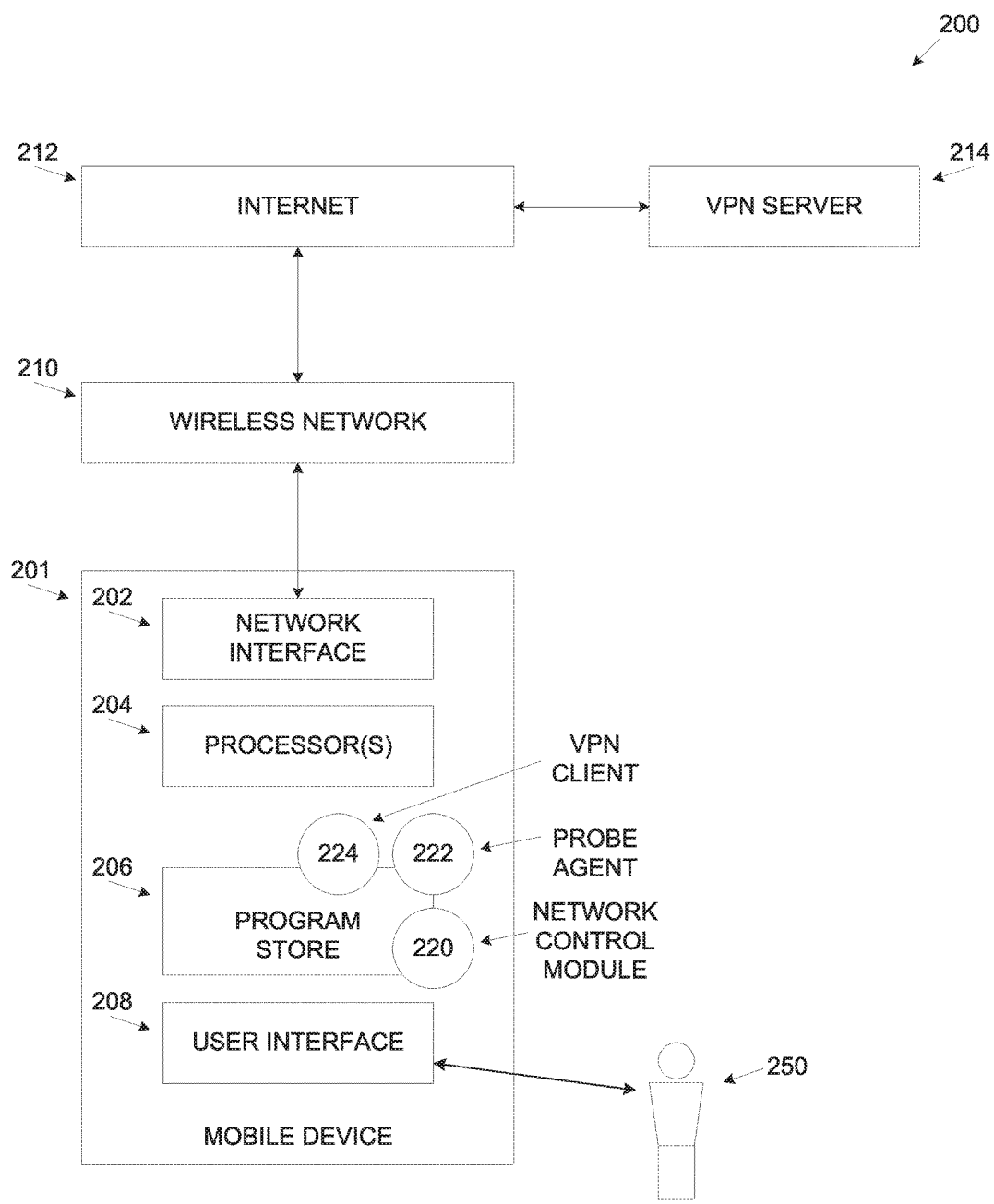

In the drawings:

FIG. 1 is a flowchart of an exemplary process of establishing automatically a VPN over an unsecure wireless network, according to some embodiments of the present invention; and FIG. 2 is a schematic illustration of an exemplary system for establishing automatically a VPN over an unsecure wireless network, according to some embodiments of the present invention.

DETAILED DESCRIPTION OF SPECIFIC EMBODIMENTS OF THE INVENTION

The present invention, in some embodiments thereof, relates to establishing a VPN over an unsecure wireless network and, more particularly, but not exclusively, to establishing automatically a VPN over an unsecure wireless network.

According to some embodiments of the present invention, there are provided methods, systems and computer program products for establishing automatically a VPN link (connection) at a mobile device connecting to the internet over an unsecure wireless network. Through the VPN link made over the unsecure wireless network to a VPN server, the network traffic may be encrypted thus increasing information security and/or data integrity of the transferred information. Network activity of the mobile device, for example, a Smartphone, a tablet, a smart watch, a laptop, a wearable network enable device and/or the like is constantly monitored to detect an attempt to connect to a wireless network.

The attempt may be detected by probing, for example, attaching, hooking and/or monitoring one or more services provided by an Operating System (OS) executed by the mobile device, for example, iOS, Android, Windows, Linux and/or the like. Additionally and/or alternatively services may be provided by one or more software modules controlling the network interface of the mobile device, for example, a network stack, a network driver and/or the like. However, typically, the services are managed by the OS. The service(s) may include, for example, an interrupt event (handler), a system call, a function call, a notification message, a driver and/or the like. In particular, the services that are related to the network interface(s) of the mobile device may be probed to detect the attempt to connect to the wireless network.

In case the attempt is made to an unsecure wireless network, for example, a Wireless Local Area Network (WLAN) (e.g. Wi-Fi), a cellular network and/or the like, a cellular network and/or the like, an evaluation is made to determine accessibility of the mobile device to connect to the VPN server. Determining whether the wireless network is secure or not may be based on analysis of wireless network characteristics, for example, an encryption type employed by the wireless network (e.g. none, open, Wired Equivalent Privacy (WEP), Wi-Fi Protected Access (WPA), etc.), use of credentials for connecting to the wireless network, a type of the network interface used to connect to the wireless network, the name or description of the network (e.g. a Service Set Identifier (SSID), etc.), and/or the like. Determining the accessibility as well as identifying the wireless network as an unsecure wireless network may be based on information obtained through one or more services of the OS, in particular the network software module(s) controlling the network interface(s), for example, a network driver, a network stack, a network application and/or the like. The accessibility to the VPN server may require as a minimum a valid internet connection, an available network port and a valid account for the VPN service. The probing may be periodically repeated at pre-defined time intervals to monitor possible changes in the network connection, for example, establishing a valid internet connection after leaving a captive portal.

In case the connection to the VPN server is determined to be feasible (accessible), a VPN client may be automatically initialized (invoked, launched). The VPN client, for example, an application, a service, an agent, a tool, a process and/or the like may access the unsecure wireless network to establish the VPN link to the VPN server. The VPN link is established and maintained to encrypt all and/or part of the network traffic going back and forth between the mobile device and the VPN server.

Optionally, one or more entries of a routing record, for example, a table, a database, a list and/or the like used to manage the network communication at the mobile device are adjusted, added and/or removed in order to allow the mobile device to access the unsecure wireless network in order to establish the VPN link with the VPN server.

Additionally, after the VPN link is established, one or more entries of the routing record may be adjusted, added and/or removed in order to prevent the data transfer of the mobile device from going through the unsecure wireless network without going through the VPN link. Preventing the network traffic from bypassing the VPN link may significantly improve information security of the information entailed in the network traffic. Optionally, transmission of data over the unsecure wireless network is prevented while the VPN link is not operational due to one or more operational conditions, for example, initializing, connecting, disconnecting, reconnecting, failed and/or the like.

Optionally, one or more indications are provided to a user of the mobile device, for example, a visual indication, an audible indication and/or the like to present the user of the VPN link status. The status indication may be presented during one or more phases of the VPN link establishment and/or connection, for example, connecting, connected, disconnected, re-connecting, failed and/or the like.

Once the mobile device disconnects from the unsecure wireless network, the VPN client may be terminated automatically.

Automatically establishing the VPN link with the VPN server and in particular, initializing automatically and terminating automatically the VPN client according to the type of the wireless network connection may present significant advantages over currently existing methods for maintaining a VPN link. The existing methods may typically require the VPN client to be initialized by the user. Additionally and/or alternatively, the existing methods may maintain the VPN client constantly operational to monitor the network connection(s) and establish the VPN link when connecting to unsecure wireless network(s). The VPN client, constantly executed by the mobile device, may be a major power consumer and may therefore significantly affect power consumption of the mobile device thus leading to battery exhaustion.

Automatically initializing and automatically terminating the VPN client only when needed and, in particular, only when the VPN server may be accessible, may significantly reduce the power consumption of the mobile device since the VPN client executes only when needed while terminated when the VPN link is not needed and/or cannot be established. Reducing the power consumption of the mobile device may in turn increase the battery life.

Moreover, automatically adjusting the routing record entries, may ensure that all data transfer is made through the VPN link and completely preventing any data transfer through the unsecure network.

Furthermore, the user experience of the mobile device may be significantly improved while providing constant holistic protection when connected to public networks. First, the user may be relieved of manually initiating and/or terminating the VPN client. Furthermore, the user may be relieved of checking the characteristics of the wireless network to determine whether it is secure or not. In addition, through the status indication presented to the user, the user may be constantly aware of the status of the network link, in particular the VPN link and may take appropriate action(s) accordingly. For example, the user may decide to transmit private data over the unsecure wireless network or not according to the status of the VPN link as presented through the status indication(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable medium may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of establishing automatically a VPN over an unsecure wireless network, according to some embodiments of the present invention. A process 100 may be executed on a mobile device to establish automatically a VPN link (connection) over an unsecure network connection. The network activity of the mobile device, in particular the wireless network activity, may be constantly probed and/or monitored to detect an attempt to connect to an unsecure wireless network. In case the attempt is determined to be made to the unsecure wireless network, the network connection may be further probed to determine accessibility of the mobile device to a VPN server providing a VPN service, for example, a valid internet connection, an available network port and a valid account for the VPN service. In case the connection to the VPN server is determined to be feasible (accessible), a VPN client may be automatically initialized (invoked, launched) to establish the VPN link with the VPN server. The VPN link is established and maintained to encrypt all and/or part of the network traffic going back and forth between the mobile device and the VPN server. Once the mobile device disconnects from the unsecure wireless network, the VPN client is automatically terminated. Naturally, the process 100 may be executed by the mobile device for one or more network interfaces available at the mobile device.

Reference is also made to FIG. 2, which is a schematic illustration of an exemplary system for establishing automatically a VPN over an unsecure wireless network, according to some embodiments of the present invention. A system 200 for executing an application usage analysis process such as the process 100 includes a mobile device 201, for example, a Smartphone, a tablet, a smart watch, a laptop, a wearable network enables device and/or the like comprising a network interface 202, a processor(s) 204 and a program store 206. The network interface 202 may provide one or more network interfaces, in particular wireless networks interfaces for connecting to one or more wireless networks 210, for example, a WLAN (e.g. Wi-Fi), a cellular network and/or the like.

The processor(s) 204, homogenous or heterogeneous, may be arranged for parallel processing, as clusters and/or as one or more multi core processor(s). The program store 206 may include one or more non-transitory persistent storage devices, for example, an Electrically Erasable Read Only Memory (EEPROM), a Flash array, a Solid State Disk (SSD) and/or the like. The program store 206 may further be utilized through one or more volatile memory devices, for example, a Random Access Memory (RAM) device used to store program code downloaded from one or more remote locations over the network interface 202 and/or from an external device, for example, a memory stick, a Flash card and/or the like.

Optionally, the mobile device 201 includes a user interface 208. The user interface 208 may include a one or more human-machine interfaces, for example, a keyboard, a pointing device, a touch surface, a display, a touch screen, an audio interface and/or the like for interacting with an associated user 250. For example, the user interface 208 be used to present the user 250, a graphic user interface (GUI) utilized through the human-machine interface(s), for example, the display and/or the touch screen.

The processor(s) 204 may execute one or more one or more software modules, wherein a software module may be, for example, a process, an application, an agent, a utility, a service, a plug-in, a script, an add-on software and/or the like each comprising a plurality of program instructions stored in a non-transitory medium such as the program store 206 and executed by one or more processors such as the processor(s) 204. Typically, the mobile device 201 hosts an OS, for example, iOS, Android, Windows, Linux and/or the like which provides an execution environment, services, infrastructure and/or the like for the software module(s) executed by the processor(s) 204.

The processor(s) 204 may execute a probe agent 222 for probing one or more network control modules 220 which control the network interface(s) 202. Typically, the network control module(s) 220 are software modules that are inherent, integrated, installed, plugged in, added on and/or the like to the OS, for example, a network stack, a network driver and/or the like allowing the OS to provide networking services to software modules, for example, applications, services, agents, tools and/or the like executing in the OS environment. For example, the network control module 220 may control the network interface 202 to allow connection to the internet 212 through one or more of the networks 210. The probe agent 222 may probe the network control module 220, for example, to check one or more characteristics of the network 210.

The processor(s) 204 may further execute a VPN client 224 for establishing, maintaining and/or controlling a VPN link over the wireless network 210 with a VPN server 214 residing on the internet 212. The VPN client 224 may be integrated with the OS as, for example, a service, a utility, an application and/or the like. Additionally and/or alternatively, the VPN client 224 may be installed in the mobile device 201, in particular in the OS environment as, for example, an application, a service, a plug-in, an add-on software module and/or the like. The VPN server 214 may be utilized through one or more remote processing nodes, for example, a server, a cluster of processing nodes and/or the like. The VPN server 214 may be further utilized through, for example, a remote service, a cloud service, a SaaS, a PaaS and/or the like.

As shown at 102, the process 100 starts with the probe agent 222 initiated after detection of an attempt of the mobile device 201 to connect to a wireless network 210. The connection may typically be initiated, handled and/or managed by the network control module(s) 220. The network control module(s) 220 may report the attempt using one or more mechanisms, typically services provided by the OS, for example, a system call, a notification message, an interrupt event and/or the like. For example, the network control module(s) 220 and/or the OS may report a network change event, a network detection event and/or the like. The probe agent 222 may therefore detect the attempted connection by monitoring the report generated by the network control module(s) 220, for example, hooking to an interrupt handler associated with the interrupt event, intercepting the notification(s), monitoring the system call(s) and/or the like.

The probe agent 222 probes and/or monitors the network activity over the wireless network 210, for example, by interacting with the network control module(s) 220 using, for example, system call(s) of the OS, an Application Programming Interface (API) of the network control module(s) 220 and/or of the OS and/or the like. The probe agent 222 may probe the network activity to first determine whether the wireless network 210 is secure or unsecure, for example, a public network. For example, the probe agent 222 may identify one or more characteristics of the wireless network 210, for example, an encryption type employed by the wireless network 210 (e.g. none, open, WEP, WPA, etc.), credentials used for connecting to the wireless network 210, an SSID of the wireless network 210a type of the network interface 202 (e.g. a network adapter used to connect to the wireless network 210) and/or the like. The probe agent 222 may analyze the detected characteristic(s) of the wireless network 210 to determine whether the wireless network 210 is secure or not. The probe agent 222 may further analyze the detected characteristic(s) of the wireless network 210 against one or more records stored at the mobile device, for example, probe agent 222 may compare the detected SSID against a list of SSIDs of known unsecure wireless networks such as the wireless network 210.

As shown at 104, in case the probe agent 222 determines that the wireless network 210 is unsecure, the probe agent 222 may further probe the unsecure wireless network 210 to determine accessibility to the VPN server 214 over the unsecure wireless network 210, i.e. determine capability of the unsecure wireless network 210 to accommodate a VPN link with the VPN server 214. The accessibility evaluated by the probe agent 222 verifies may include, for example, checking a connection to the internet 212, verifying available network port(s), authenticating a valid account for a VPN service provided by the VPN server 214 and/or the like. Therefore, in addition to verifying a valid connection to the internet 212, the probe agent 222 must verify the network port(s) required for establishing the VPN link is available and free. For example, the probe agent 222 verifies that the required network port(s) are properly defined and/or available at the network control module(s) 220 and/or the OS. The probe agent 222 may also probe to verify the required network port(s) are not blocked by a firewall and/or the like. Naturally, in order to establish the VPN link with the VPN server 214, the mobile device 201 should be associated with a valid account for the VPN service provided by the VPN server 214.

The probe agent 222 may repeat probing the accessibility of the unsecure wireless network 210 periodically at predefined time intervals, for example, 1 second to monitor possible changes in the network connection. For example, the connection to the internet 212 through the unsecure wireless network 210 may be initiated from a captive portal which is a webpage the user 250 must view and/or interact with before granted access to the internet 212. The probe agent 222 may therefore repeatedly probe the network activity with the unsecure wireless network 210 to detect the connection to the internet 212 is valid after the user 250 leaves the captive portal.

Optionally, the probe agent 222 adjusts, for example, edits, adds and/or removes one or more entries of a routing record, for example, a routing table, a routing database, a routing list and/or the like typically used by the network control module(s) 220 to control the network traffic between the network interface 202 and the wireless network 210. The routing record entries may set the network communication configuration and/or routing rules for the network interface 202.

The probe agent 222 may adjust the routing record to enable access for the probe agent 222 to the unsecure network 210 in order to determine its accessibility, for example, to access the internet 212, to resolve the address of the VPN server 214, to access the VPN server 214 and/or the like. The probe agent 222 may adjust the routing record entry(s) after determining valid accessibility to the VPN server 214, i.e. the VPN server 214 is accessible from the mobile device 201 over the unsecure wireless network 210. The probe agent 222 may store the original entries of the routing record in, for example, the program store 206. The original routing record entry(s) dictate the network communication configuration and/or routing rules for the network interface 202 which are normally and/or typically used by the network control module(s) 220, for example, to connect to secure network(s) and/or the like.

As shown at 106, the probe agent 222 automatically initializes (invokes, launches) the VPN client 224 according to the determined accessibility, i.e. the probe agent 222 invokes the VPN client 224 in case the accessibility is determined valid (feasible). The VPN client 224 then establishes the VPN link with the VPN server 214 over the unsecure wireless network 210. The data transmitted over the VPN link (tunnel) and/or part of it may be encrypted to increase information security of the transmitted data to prevent interception and/or altering of the transmitted data by a potential malicious party that may be monitoring the unsecure wireless network 210.

As shown at 108, after the VPN client 224 establishes the VPN link with the VPN server 214, the probe agent 222 may adjust one or more one or more entries of the routing record to direct the data transmitted over the unsecure wireless network 210 through the VPN link. This is done to verify that the transmitted data does not bypass the VPN link and go through unsecure connection established with the re wireless network 210.

The probe agent 222 may further prevent transmission of data over the unsecure wireless network 210 while the VPN link is not operational due to one or more operational conditions, for example, the VPN client 224 and/or the VPN link is initializing, connecting, disconnecting, reconnecting, failed, the VPN server 214 is not available and/or the like. For example, the probe agent 222 may manipulate the routing record to prevent ingoing and/or outgoing network traffic. In another example, the probe agent 222 may implement a "kill switch" operation to prevent any data from being transmitted over the unsecure wireless network 210 until the mobile device 201 disconnects from the unsecure wireless network 210.

Optionally, the probe agent 222 provides one or more indications to the user 250 through one or more of the user interface(s) 208, for example, a visual indication, an audible indication and/or the like. The probe agent 222 may provide the indication(s), for example, to present the status of the VPN link, for example, initializing, connecting, connected, disconnected, re-connecting, failed and/or the like.

Optionally, the probe agent 222 logs an event entry in a log record, for example, a table, a database, a list and/or the like for one or more detected attempts and/or established VPN sessions. The event entry may include one or more network connection parameters identified during the attempted connection and, in particular during the VPN session over the VPN link with the VPN server 214. The network connection parameters may include, for example, a time and/or date of the attempt, time duration of session, a name of the unsecure wireless network, an address of an accessed gateway, a domain name, VPN link status event(s) and/or the like. The logged event entry(s) may be may be saved and uploaded to one or more remote locations on the internet 212, for example, a server, a cloud service and/or the like when the internet 212 is available for the mobile device 201. The logged event entry(s) may be used for, tracking, analysis, diagnosis and/or the like.

Optionally, the probe agent 222 stores at least some of the data that is prevented from being transmitted over the unsecure wireless network 210 while the VPN link is not operational. The stored data may be saved and transmitted to one or more remote locations on the internet 212, for example, a server, a cloud service and/or the like when the internet 212 is available for the mobile device 201. The stored data may be used for one or more objectives, for example, resend the unsent data, restore the unsent data, analysis, diagnosis and/or the like.

As shown at 110, the probe agent 222 automatically terminates the VPN client 224 when the mobile device 201 disconnects from the unsecure wireless network 210. Disconnection from the unsecure wireless network 210 may result from, for example, the network control module(s) 220 establish a connection with a secure network, the mobile device 201 is out of range of the unsecure wireless network 210, the network interface(s) 202 is disabled and/or the like.

After disconnecting from the unsecure wireless network 210, the probe agent 222 may restore the original routing record entry(s) to reinstate the network routing rules and/or configuration which were adjusted at steps 104 and/or 108. For example, in case one the probe agent 222 added one or more routing record entry(s) to support the address resolution of the VPN server, the probe agent 222 may remove the added routing record entry(s). In some embodiments, the probe agent 222 may avoid restoring the original routing record entry(s) when the VPN link is not operational while the mobile device 201 is still connected to the unsecure wireless network 210 in order to block data transfer to/from the mobile device 201 over the unsecure wireless network. For example, in case the mobile device 201 is connected to the unsecure wireless network 210 but the VPN link is not operational, for example, the VPN client 224 fails, the link with the VPN server 214 is lost, the VPN server 214 is unavailable and/or the like.

It is expected that during the life of a patent maturing from this application many relevant systems, methods and computer programs will be developed and the scope of the term mobile device network and network interface(s) is intended to include all such new technologies a priori.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of automatically initializing a Virtual Private Network (VPN) client to establish a VPN link between a mobile device and a VPN server over an unsecure wireless network, comprising:
using at least one processor of said mobile device for:
monitoring continuously at least one service initiated by at least one network control module of an Operating System (OS) executed by said mobile device, said at least one service is indicative of attempts to connect to at least one network via at least one network interface of said mobile device;
detecting an attempt to establish a wireless connection to the internet via said unsecure wireless network;
periodically probing said unsecure wireless network at pre-defined time intervals to determine accessibility to said VPN server over said unsecure wireless network;
initializing automatically said VPN client based on said determination, said VPN client executed by said at least one processor establishes a secure VPN link between said mobile device and said VPN server over said unsecure wireless network;
directing network traffic of said mobile device through said secure VPN link; and
terminating automatically said VPN client when said mobile device disconnects from said unsecure wireless network.

2. The method according to claim 1, wherein said at least one service is a member of a group consisting of: an interrupt event, a notification message, a system call and a function call.

3. The method according to claim 1, wherein said accessibility comprises at least an internet access, a free network port and an active account on said VPN server.

4. The method according to claim 1, wherein at least one routing entry is adjusted in a routing record of a network interface of said mobile device to support resolution of an address of said VPN server.

5. The method according to claim 1, further comprising adjusting at least one entry in a routing record of a network interface of said mobile device to prevent said network traffic from going through said unsecure wireless network without going through said VPN link.

6. The method according to claim 5, further comprising preventing said network traffic from going through said unsecure wireless network while said VPN link is not operational due to at least one operational condition of said VPN link, said at least one operational condition is a member of a group consisting of: initializing, connecting, disconnecting, reconnecting and failed.

7. The method according to claim 1, further comprising restoring at least one original entry in a routing record of a network interface of said mobile device after disconnecting from said unsecure wireless network, said at least one original entry was adjusted to support said VPN link over said unsecure wireless network.

8. The method according to claim 1, further comprising indicating a user of said mobile device of a status of said VPN link.

9. The method according to claim 1, further comprising logging an event entry for said attempt in a log record, said event entry comprises at least one network connection parameter of a link established by said attempt.

10. The method according to claim 1, further comprising storing at least some network traffic data that is blocked while said VPN link is not operational due to at least one operational condition of said VPN link, said at least one operational condition is a member of a group consisting of: initializing, connecting, disconnecting, reconnecting and failed.

11. A mobile device for automatically initializing a Virtual Private Network (VPN) client to establish a VPN link between a mobile device and a VPN server over an unsecure wireless network, comprising:
at least one processor of said mobile device executing a code, said code comprising:
code instructions to monitor continuously at least one service initiated by at least one network control module of an Operating System (OS) executed by said mobile device, said at least one service is indicative of attempts to connect to at least one network via at least one network interface of said mobile device;
code instructions to detect an attempt to establish a wireless connection to the Internet via said unsecure wireless network;
code instructions to periodically probe said unsecure wireless network at pre-defined time intervals to determine accessibility to said VPN server over said unsecure wireless network;
code instructions to initialize automatically said VPN client based on said determination, said VPN client executed by said at least one processor establishes a secure VPN link between said mobile device and said VPN server over said unsecure wireless network;
code instructions to direct network traffic of said mobile device through said secure VPN link; and
code instructions to terminate automatically said VPN client when said mobile device disconnects from said unsecure wireless network.

* * * * *